Dec. 11, 1928.
B. J. MOORE ET AL
1,694,749
TRUCK
Filed Nov. 11, 1927   2 Sheets-Sheet 1
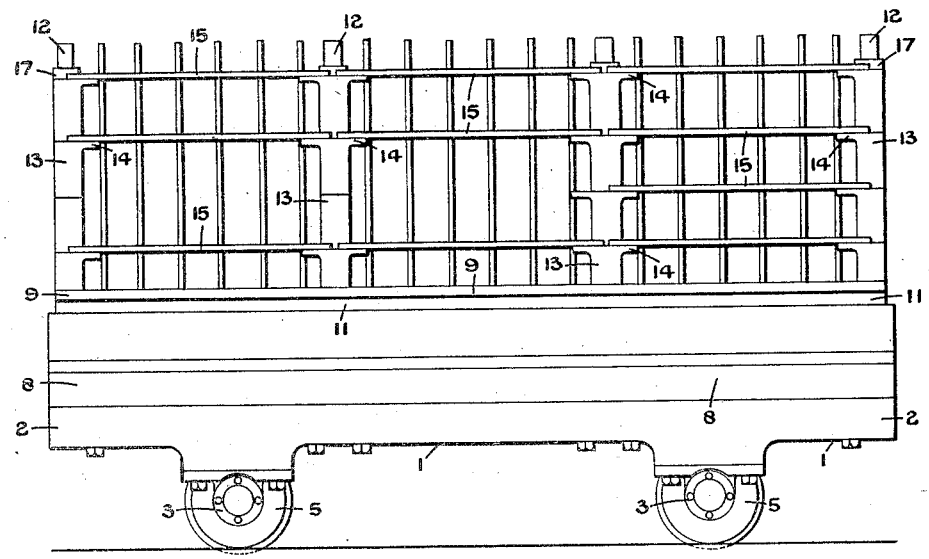
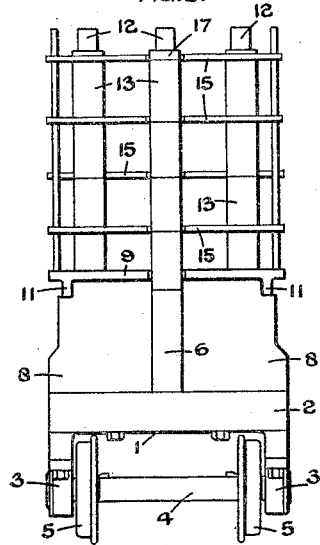

Dec. 11, 1928.    1,694,749
B. J. MOORE ET AL
TRUCK
Filed Nov. 11, 1927    2 Sheets-Sheet 2

Inventors
Bernard Joseph Moore
and
Arthur John Campbell
By B. Singer, Atty.

Patented Dec. 11, 1928.

1,694,749

UNITED STATES PATENT OFFICE.

BERNARD JOSEPH MOORE, OF STOKE-ON-TRENT, AND ARTHUR JOHN CAMPBELL, OF STONE, ENGLAND, ASSIGNORS OF ONE-HALF TO GIBBONS BROTHERS LIMITED, OF DUDLEY, ENGLAND, A COMPANY OF GREAT BRITAIN.

TRUCK.

Application filed November 11, 1927, Serial No. 232,687, and in Great Britain November 19, 1926.

This invention relates to trucks and is intended primarily for application to trucks used for conveying articles of pottery through a kiln.

One of the objects of the present invention is to provide the truck with a superstructure of shelves, trays or like supports which can be built up at various heights to suit articles of varying size.

A further object of the present invention is to provide a construction whereby the supports or trays for the articles to be carried can be quickly erected in the desired positions and can be quickly removed when unloading.

A further object of the present invention is to provide new or improved means for protecting the articles carried by the truck against lateral displacement.

A further object of the present invention is to construct the truck so that its under structure and particularly the wheel bearings will not be damaged by over heating from the kiln.

A further object of the present invention is to construct the truck so that it will assist in retaining the heat within the kiln.

Further objects of the present invention will be apparent from the following detailed description.

Referring to the drawings:—

Figure 1 is a view in side elevation showing a truck constructed in accordance with the present invention.

Figure 2 is an end view.

Figure 3:
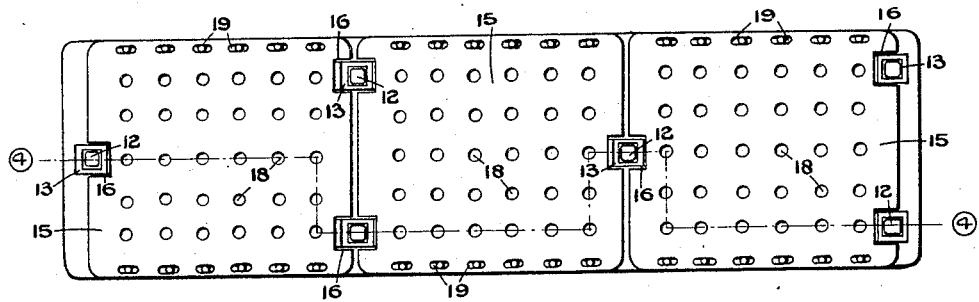
Figure 3 is a plan view.

In the construction illustrated the truck comprises an under structure including a truck base 1 which may be built up of metal plates and which is provided with a lip or upwardly extending flange 2 at its ends and sides.

This truck base 1 is provided with bearings 3 having axles 4 carrying the supporting wheels 5 which are constructed to run on rails.

To the truck base 1 are secured a number of sockets 6 each of these sockets having a flange 7 by which it is bolted to the truck base and each of said sockets being preferably of non-circular section. In the construction which is shown in the drawings the sockets are of square section.

In the arrangement illustrated the truck is provided with two sockets on the longitudinal centre line and two pairs of sockets which are offset from the centre line.

These sockets 6 are surrounded by and enclosed in a mass 8 of heat resisting material such as insulating brick or fire-clay and upon the top of this mass of material 8 is a plate 9 having transverse ribs 10 upon its under side and longitudinal ribs 11.

The heat resisting material is preferably moulded or built up so that it fills the hollow spaces between the ribs 10 and between the ribs 11.

This mass 8 of heat resisting material operates to prevent the heat of the kiln from striking downwardly through the truck base and drying up the lubricant in the bearings 3 or otherwise damaging the under structure of the truck.

Further, the mass of material 8 virtually fills the opening in the lower part of the kiln through which the truck travels so that it assists in retaining the high temperature of the kiln.

Within the sockets 6 are placed removable pillars 12. These pillars may be of square section or as shown they may be of octagonal section, in either case they are removably mounted in the sockets 6 and when within the sockets they cannot turn on their own centres.

Figure 5:
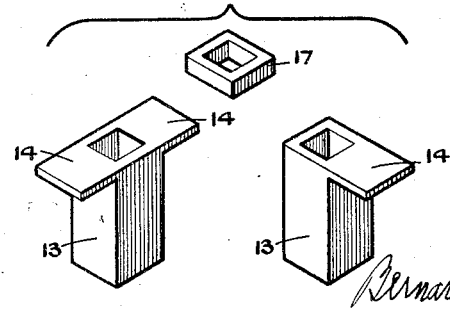
Figure 5 is a perspective view upon an enlarged scale showing certain of the parts.

Upon these pillars 12 are placed a number of flanged distance tubes 13 some of which (see Figure 5) have two oppositely disposed flanges 14 at the top and others of which have only one flange 14.

These distance tubes may be supplied in a variety of lengths and if required some distance tubes may be supplied free from flanges such as 14.

The distance tubes 13 and the flanges 14 serve for supporting the trays 15.

In the construction illustrated each complete tray (see Figure 3) is made in three parts, each of these parts being given the reference numeral 15.

These trays may be made of metal or any other suitable material and one edge is provided with two longitudinal notches 16 while the opposite edge is provided with a single longitudinal notch 16 the notches 16 engaging around the tubular distance pieces 13.

It will thus be seen that each section of the shelf or tray 15 is supported at three points upon the flanges 14.

In order definitely to position the top tray the posts 12 are provided with collars 17 (see Figures 4 and 5) corresponding in width with the width of the parts 13 of the distance tubes, these square collars engaging the notches 16 of the upper tray sections 15.

Figure 4:
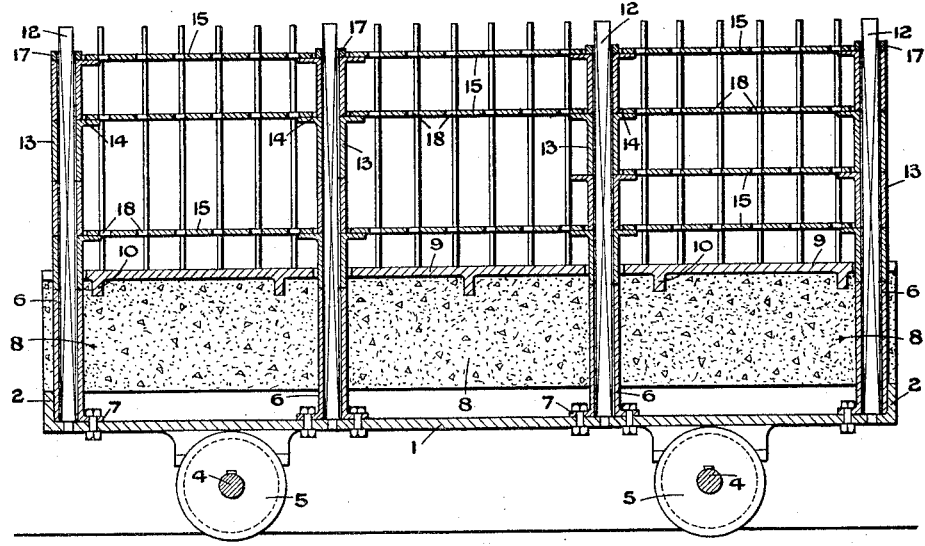
Figure 4 is a sectional side elevation on line 4—4 of Figure 3.

It is of course obvious that the tray sections 15 may be erected at various heights by the means proposed and as shown clearly from Figure 4 certain of the tray sections may be omitted in order to give greater height available for goods above other tray sections.

The tray sections are preferably provided with a large number of holes 18 in order to allow the hot air to circulate and near their longitudinal edges they are preferably provided with slots such as 19.

When the tray sections are erected the slots 19 of superposed tray sections are in register and staves of any suitable material may be spaced vertically in the slots 19 to retain the goods in position upon the trays and such staves may extend above the level of the top tray sections for retaining the goods thereon against lateral displacement.

What we claim then is:—

1. A truck comprising a truck base, provided with axles and supporting wheels, pillars on said base and projecting upwardly therefrom, distance tubes removably mounted on said pillars and trays having notches at their edges engaged and supported by the said distance tubes.

2. A truck comprising a truck base provided with axles and supporting wheels, heat resisting material on said base, pillars on said base and projecting upwardly therefrom, distance tubes removably mounted on said pillars, and trays having notches at their edges engaged and supported by said distance tubes.

3. A truck comprising a truck base having upwardly extending flanges at its edges, said base being provided with axles and supporting wheels, heat resisting material on said base, pillars on said base and projecting upwardly therefrom, distance tubes removably mounted on said pillars, and trays having notches at their edges engaged and supported by said distance tubes.

4. A truck comprising a truck base provided with axles and supporting wheels, sockets fixed to said base and projecting upwardly therefrom, pillars in said sockets and projecting from the upper ends thereof, distance tubes removably mounted on said pillars, and trays having notches at their edges engaged and supported by said distance tubes.

5. A truck comprising a truck base provided with axles and supporting wheels, pillars on said base and projecting upwardly therefrom, distance tubes removably mounted on said pillars, lateral flanges on some of said tubes, and trays resting on said flanges and engaging said tubes by their edges.

6. A truck comprising a truck base provided with axles and supporting wheels, pillars on said base and projecting upwardly therefrom, some of said pillars being disposed upon the longitudinal centre of said truck, others of said pillars being disposed in pairs between said central pillars, distance tubes removably mounted on said pillars, and trays having notches at their edges engaged and supported by said distance tubes.

7. A truck comprising a truck base provided with axles and supporting wheels, pillars on said base and projecting upwardly therefrom, distance tubes removably mounted on said pillars, lateral flanges on some of said tubes, collars on said pillars above the upper most distance tubes, and trays resting on said flanges some of which trays engage said collars.

8. A truck comprising a truck base provided with axles and supporting wheels, heat resisting material on said base, a ribbed plate upon the upper surface of said heat resisting material, pillars on said base and projecting upwardly therefrom, distance tubes removably mounted on said pillars, and trays having notches at their edges engaged and supported by said distance tubes.

9. A truck comprising a truck base provided with axles and supporting wheels, pillars on said base and projecting upwardly therefrom, distance tubes removably mounted on said pillars, and trays having notches at their edges engaged and supported by said distance tubes, said trays having openings near their edges for receiving staves for retaining the goods on the trays against lateral displacement.

10. A truck comprising a truck base having upwardly extending flanges at its edges, said base being provided with axles and supporting wheels, heat resisting material on said base, a ribbed plate upon the upper surface of said heat resisting material, sockets fixed to said base and projecting upwardly therefrom, pillars in said sockets and projecting from the upper ends thereof, distance tubes removably mounted on said pillars, lateral flanges on some of said tubes, and trays resting on said flanges and engaging said tubes by their edges.

In witness whereof we affix our signatures.

BERNARD JOSEPH MOORE.
ARTHUR JOHN CAMPBELL.